(12) United States Patent
Laval et al.

(10) Patent No.: US 10,965,153 B2
(45) Date of Patent: Mar. 30, 2021

(54) METHODS OF MICROGRID COMMUNICATIONS AND CONNECTION TRANSITIONS

(71) Applicant: Duke Energy Corporation, Charlotte, NC (US)

(72) Inventors: Stuart Laval, Fort Mill, SC (US); Tom Fenimore, Charlotte, NC (US)

(73) Assignee: DUKE ENERGY CORPORATION, Charlotte, NC (US)

( * ) Notice: Subject to any disclaimer, the term of this patent is extended or adjusted under 35 U.S.C. 154(b) by 491 days.

(21) Appl. No.: 15/424,227

(22) Filed: Feb. 3, 2017

(65) Prior Publication Data
US 2017/0229868 A1 Aug. 10, 2017

Related U.S. Application Data

(60) Provisional application No. 62/453,837, filed on Feb. 2, 2017, provisional application No. 62/292,004, filed on Feb. 5, 2016.

(51) Int. Cl.
*H02J 13/00* (2006.01)
*H02J 3/38* (2006.01)
(Continued)

(52) U.S. Cl.
CPC ........ *H02J 13/0062* (2013.01); *H02J 3/0073* (2020.01); *H02J 3/381* (2013.01);
(Continued)

(58) Field of Classification Search
CPC ...... H02J 13/0062; H02J 3/0073; H02J 3/382; H02J 3/381; H02J 13/0079; H02J 13/0086;
(Continued)

(56) References Cited

U.S. PATENT DOCUMENTS 7,466,570 B2 12/2008 Lin et al.
7,502,696 B2 3/2009 Moxley
(Continued)

FOREIGN PATENT DOCUMENTS

CN 102403736 A 4/2012
CN 102510124 A 6/2012
(Continued)

OTHER PUBLICATIONS

Wikipedia contributors. (Aug. 4, 2019). Peer-to-peer. In Wikipedia, The Free Encyclopedia. Retrieved 21:29, Aug. 8, 2019, from https://en.wikipedia.org/w/index.php?title=Peer-to-peer&oldid=909229594 (Year: 2019).*
(Continued)

*Primary Examiner* — Daniel Cavallari
(74) *Attorney, Agent, or Firm* — Myers Bigel, P.A.

(57) ABSTRACT

Methods of microgrid communications and connection transitions are provided. The methods include methods of operating recloser and/or switch systems. The methods of operating recloser and/or switch systems include transmitting a communication from a recloser and/or switch system of a microgrid to an inverter of the microgrid to trigger a control state change of the inverter. Related methods of operating inverters are also provided.

22 Claims, 9 Drawing Sheets

(51) Int. Cl.
*H02J 3/00* (2006.01)
*H02J 3/32* (2006.01)

(52) U.S. Cl.
CPC .......... *H02J 3/382* (2013.01); *H02J 13/0079* (2013.01); *H02J 13/0086* (2013.01); *H02J 3/32* (2013.01); *H02J 3/383* (2013.01); *H02J 3/386* (2013.01); *H02J 3/388* (2020.01); *H02J 13/0075* (2013.01); *Y02E 10/56* (2013.01); *Y02E 10/76* (2013.01); *Y02E 40/70* (2013.01); *Y04S 10/12* (2013.01); *Y04S 10/123* (2013.01)

(58) Field of Classification Search
CPC ........ H02J 3/388; H02J 13/0075; H02J 3/383; H02J 3/32; H02J 3/386; H02J 13/00034; H02J 13/00028; H02J 13/00004; H02J 13/00026; H02J 13/00024; H02J 13/00016; H02J 2300/24; H02J 2300/20; H02J 2300/28; H02J 2300/10; H02J 2310/16; H02J 2310/10; Y02E 10/56; Y02E 10/76; Y02E 40/70; Y04S 10/12; Y04S 10/123; Y04S 40/126; Y04S 40/124
See application file for complete search history.

(56) References Cited

U.S. PATENT DOCUMENTS

| | | | |
|---|---|---|---|
| 7,745,956 B2 | 6/2010 | Ito et al. | |
| 8,457,912 B1 | 6/2013 | Wells | |
| 8,682,495 B2* | 3/2014 | Carralero | G05B 15/02 700/286 |
| 8,736,111 B2 | 5/2014 | Song et al. | |
| 8,767,362 B2 | 7/2014 | Yamane et al. | |
| 9,124,127 B2 | 9/2015 | Timbus et al. | |
| 9,142,968 B2 | 9/2015 | Ropp | |
| 9,170,306 B2 | 10/2015 | Zheng et al. | |
| 2011/0216562 A1* | 9/2011 | Gengenbach | H02J 3/18 363/71 |
| 2012/0033473 A1 | 2/2012 | Scharf | |
| 2012/0283888 A1 | 11/2012 | Mao et al. | |
| 2014/0100705 A1 | 4/2014 | Shi et al. | |
| 2014/0200722 A1 | 7/2014 | Bhavaraju | |
| 2014/0244187 A1* | 8/2014 | Sahinoglu | H02J 3/38 702/58 |
| 2014/0306534 A1 | 10/2014 | Shi et al. | |
| 2015/0054339 A1 | 2/2015 | Zhao et al. | |
| 2015/0120221 A1 | 4/2015 | Ding et al. | |
| 2015/0229268 A1* | 8/2015 | Satake | H02J 13/0086 136/244 |
| 2017/0005473 A1* | 1/2017 | Somani | H02J 3/381 |
| 2017/0160711 A1* | 6/2017 | Wong | G05B 19/042 |

FOREIGN PATENT DOCUMENTS

| | | |
|---|---|---|
| CN | 102723741 A | 10/2012 |
| CN | 202997589 U | 6/2013 |
| CN | 103475023 A | 12/2013 |
| CN | 103795086 A | 5/2014 |
| EP | 2621048 A1 | 7/2013 |
| EP | 2632011 A1 | 8/2013 |
| WO | WO 2008/011522 A2 | 1/2008 |
| WO | WO 2012/058114 A2 | 5/2012 |
| WO | WO 2013/079360 A2 | 6/2013 |
| WO | WO 2013/142553 A2 | 9/2013 |
| WO | WO 2014/189725 A1 | 11/2014 |
| WO | WO 2015/131958 A1 | 9/2015 |

OTHER PUBLICATIONS

Initiative, N. M. G. (2007). A Compendium of Modern Grid Technologies. (Year: 2007).*
Wikipedia contributors. "Point-to-multipoint communication." Wikipedia, The Free Encyclopedia. Wikipedia, The Free Encyclopedia, Nov. 18, 2019. Web. Feb. 11, 2020. (Year: 2020).*
Shukla, S., Deng, Y., Shukla, S., & Mili, L. (Feb. 2014). Construction of a microgrid communication network. In ISGT 2014 (pp. 1-5). IEEE. (Year: 2014).*
Vukojevic, A., Laval, S., & Handley, J. (Feb. 2015). An integrated utility microgrid test site ecosystem optimized by an open interoperable distributed intelligence platform. In 2015 IEEE Power & Energy Society Innovative Smart Grid Technologies Conference (ISGT) (pp. 1-5). IEEE. (Year: 2015).*
Smith, T., Vico, J., & Wester, C. (Apr. 2011). Advanced distribution reclosing using wireless communications. In 2011 Rural Electric Power Conference (pp. C3-1). IEEE. (Year: 2011).*
Wikipedia contributors. "Microgrid." Wikipedia, The Free Encyclopedia. Wikipedia, The Free Encyclopedia, Jun. 8, 2020. Web. Jun. 17, 2020. (Year: 2020).*
"Leading Advancements in Interoperability. Open Field Message Bus (OpenFMB)", Duke Energy, 2016. https://www.duke-energy.com/our-company/about-us/smart-grid/coalition. (Year: 2016).*
Laval, S. S. (2015). A Framework for Interoperability on the United States Electric Grid Infrastructure (Doctoral dissertation, University of Central Florida). (Year: 2015).*
Lusk, S., Lawrence, D., & Suvana, P. (2015). Cyber-intrusion Auto-response and Policy Management System (CAPMS). ViaSat Inc., Boston, MA (United States). (Year: 2015).*
Blair et al. "Towards New Transport Services to Support Distributed Multimedia Applications" 4th IEEE ComSoc International Workshop on Multimedia Communications (Apr. 1-4, 1992)
García et al. "QoS Support for Distributed Multimedia Communications" Distributed Platforms, IFIP—The International Federation for Information Processing (1996).

* cited by examiner

METHODS OF MICROGRID COMMUNICATIONS AND CONNECTION TRANSITIONS

CLAIM OF PRIORITY

The present application claims the benefit of U.S. Provisional Patent Application Ser. No. 62/453,837, filed Feb. 2, 2017 and U.S. Provisional Patent Application Ser. No. 62/292,004, filed Feb. 5, 2016, entitled Systems and Methods for Microgrid Islands, the disclosures of which are hereby incorporated herein in their entirety by reference.

FIELD

The present disclosure relates to power systems and, more particularly, to microgrids.

BACKGROUND

A microgrid is an energy system that may include distributed energy resources and loads that are capable of operating in concert with, or independently of, a main power grid. Coordinating the microgrid with changes in status of the main power grid, however, may be slow and imprecise. An imprecise or untimely transition of equipment of the microgrid with respect to a status change of the main power grid may damage the equipment of the microgrid.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present inventive concepts.

Various embodiments of the present inventive concepts include a method that includes opening a recloser, and/or switch, at a point of common coupling of a microgrid. The method includes transmitting, via a communications interface of a recloser and/or switch system that includes the recloser and/or switch, a first communication to an inverter of the microgrid to trigger a first control state change of the inverter. The method includes detecting, by the recloser and/or switch system, restoration of power to a utility grid. Moreover, the method includes transmitting, via the communications interface of the recloser and/or switch system, a second communication to the inverter to trigger a second control state change of the inverter.

According to various embodiments, transmitting the first communication may include transmitting, in response to opening the recloser and/or switch, a first command to transition the inverter from a grid-connected mode to an islanded mode. In some embodiments, transmitting the first command may include transmitting the first command to a plurality of inverters of the microgrid, in response to opening the recloser and/or switch. Moreover, transmitting the second communication may include transmitting, in response to detecting the restoration of power to the utility grid, a second command to transition the inverter from the islanded mode back to the grid-connected mode. In some embodiments, transmitting the second command may include transmitting the second command to the plurality of inverters, in response to detecting the restoration of power to the utility grid.

In various embodiments, the first and second communications may be peer-to-peer or peer-to-multipeer communications. Additionally or alternatively, the method may include, after transmitting the first communication, and before transmitting the second communication, receiving, via the communications interface, a third communication from the inverter confirming that the inverter will make the first control state change. Moreover, opening the recloser and/or switch may include opening the recloser and/or switch in response to detecting a power disturbance of the utility grid.

According to various embodiments, the method may include receiving, at the recloser and/or switch system, a command to intentionally transition to an islanded mode independently of any power disturbance of the utility grid. Opening the recloser and/or switch may include opening the recloser and/or switch in response to the command. In some embodiments, receiving the command to intentionally transition to the islanded mode may include receiving the command via a field message bus.

In various embodiments, transmitting the first communication may include publishing, via a field message bus of the microgrid, an anomaly event, in response to opening the recloser and/or switch. The recloser and/or switch system may notify the inverter, a controller of the microgrid, and a utility SCADA system of the anomaly event.

According to various embodiments, transmitting the second communication may include publishing, via a field message bus of the microgrid, an event indicating that grid power has returned, in response to detecting the restoration of power to the utility grid. Moreover, the method may include, after publishing the event indicating that grid power has returned, awaiting completion of a grid synchronization process. The method may also include, after the completion of the grid synchronization process, closing the recloser and/or switch to reconnect the microgrid to the utility grid.

A method, according to various embodiments, is provided that includes receiving, via a communications interface of an inverter of a microgrid, a first communication from a Point of Common Coupling (PCC) of the microgrid. The method may include transitioning the inverter from a grid-connected mode to an islanded mode, in response to the first communication. The method may include receiving, via the communications interface of the inverter, a second communication from the PCC. Moreover, the method may include transitioning the inverter from the islanded mode back to the grid-connected mode, in response to the second communication.

According to various embodiments, the inverter may be an inverter of a distributed energy resource, and the first and second communications may be first and second peer-to-peer or peer-to-multipeer communications, respectively. Transitioning from the grid-connected mode may include changing from a current-source grid-following mode of the inverter of the distributed energy resource to a voltage-source isochronous mode of the inverter of the distributed energy resource, in response to the first peer-to-peer or peer-to-multipeer communication. Moreover, transitioning from the islanded mode may include changing from the voltage-source isochronous mode of the inverter of the distributed energy resource to another mode of the inverter of the distributed energy resource, in response to the second peer-to-peer or peer-to-multipeer communication. In some embodiments, the inverter of the distributed energy resource may be coupled to one distributed energy resource among a plurality of islandable distributed energy resources that are controlled by the PCC.

In various embodiments, the inverter may be an inverter of a distributed energy resource, and the first and second communications may be first and second peer-to-peer or peer-to-multipeer communications, respectively. Transitioning from the grid-connected mode may include changing from a voltage-source grid-following mode of the inverter of the distributed energy resource to a voltage-source isochronous mode of the inverter of the distributed energy resource, in response to the first peer-to-peer or peer-to-multipeer communication. Moreover, transitioning from the islanded mode may include changing from the voltage-source isochronous mode of the inverter of the distributed energy resource to another mode of the inverter of the distributed energy resource, in response to the second peer-to-peer or peer-to-multipeer communication. Additionally or alternatively, receiving the first communication may include subscribing, via a field message bus of the microgrid, to a schedule change that is due to an anomaly event.

A method, according to various embodiments, is provided that includes opening a recloser, and/or switch, that is at a Point of Common Coupling (PCC) of a microgrid. The method includes transmitting a peer-to-peer or peer-to-multipeer communication from the PCC of the microgrid to an inverter of the microgrid to trigger a change from a grid-connected mode of the inverter to an islanded mode of the inverter. In some embodiments, the recloser and/or switch is an islanding switch, and transmitting the peer-to-peer or peer-to-multipeer communication includes transmitting, in response to opening the islanding switch, a command to transition the inverter from the grid-connected mode to the islanded mode.

A method, according to various embodiments, is provided that includes detecting at a Point of Common Coupling (PCC) of a microgrid, restoration of power to a utility grid. The method includes transmitting a peer-to-peer or peer-to-multipeer communication from the PCC of the microgrid to an inverter of the microgrid to trigger a change from an islanded mode of the inverter to a grid-connected mode of the inverter.

It is noted that aspects of the present inventive concepts described with respect to one embodiment may be incorporated in a different embodiment although not specifically described relative thereto. That is, all embodiments and/or features of any embodiment can be combined in any way and/or combination. Applicant(s) reserve(s) the right to change any originally filed claim or file any new claim accordingly, including the right to be able to amend any originally filed claim to depend from and/or incorporate any feature of any other claim although not originally claimed in that manner. These and other objects and/or aspects of the present inventive concepts are explained in detail below.

BRIEF DESCRIPTION OF THE DRAWINGS

The accompanying drawings, which form a part of the specification, illustrate various embodiments of the present inventive concepts. The drawings and description together serve to fully explain embodiments of the present inventive concepts.

DETAILED DESCRIPTION

An inverter of a microgrid may have its own point of common coupling, rather than the broader point of common coupling of the microgrid, that connects and disconnects the inverter with respect to a larger power system. Such an inverter does not communicate with the microgrid's point of common coupling. Rather, communications for such a microgrid may rely on a centralized utility data center and may be relatively slow.

Various embodiments described herein, however, may provide local communications and analytics for a microgrid. For example, communications and analytics may be provided at an inverter or at a recloser/switch system, rather than at a central plant controller. Such communications and analytics may be beneficial for (a) transitioning from a grid-connected mode to an islanded mode and/or for (b) transitioning from an islanded mode to a grid-connected mode.

For example, referring to (a) transitioning from a grid-connected mode to an islanded mode, local communications and analytics may recognize the occurrence of a power outage and provide a local decision triggering a control command that forces the inverter to move to a different state. As an example, there may be a device-to-device interaction pattern in which an open event/alarm from a recloser/switch system makes its way to the inverter, the inverter subscribes to the information, and the inverter then responds by saying that it received the open alarm and knows that the grid is open and the inverter will become a grid (i.e., a voltage source).

Moreover, referring to (b) transitioning from an islanded mode to a grid-connected mode, it may be beneficial to communicate the status of both sides of a recloser/switch to the inverter because the inverter will need to be ramped up to bring performance of the microgrid in line with the larger grid. In contrast, in a traditional communications environment, latency may be too long and timing may be not accurate enough to quickly communicate between the recloser/switch system and the inverter. Accordingly, various embodiments herein may provide high-speed communications that give a clear direction for a distributed energy resource (e.g. a battery) to adjust and harmonize with the performance of the recloser/switch.

In some embodiments, the distributed energy resource may not be located near the recloser/switch, but rather may be behind the recloser/switch (e.g., by at least hundreds of feet). For example, the recloser/switch may be at or near the top of a utility pole, and the distributed energy resource may be on the premises of a customer of the utility.

Figure 1A:
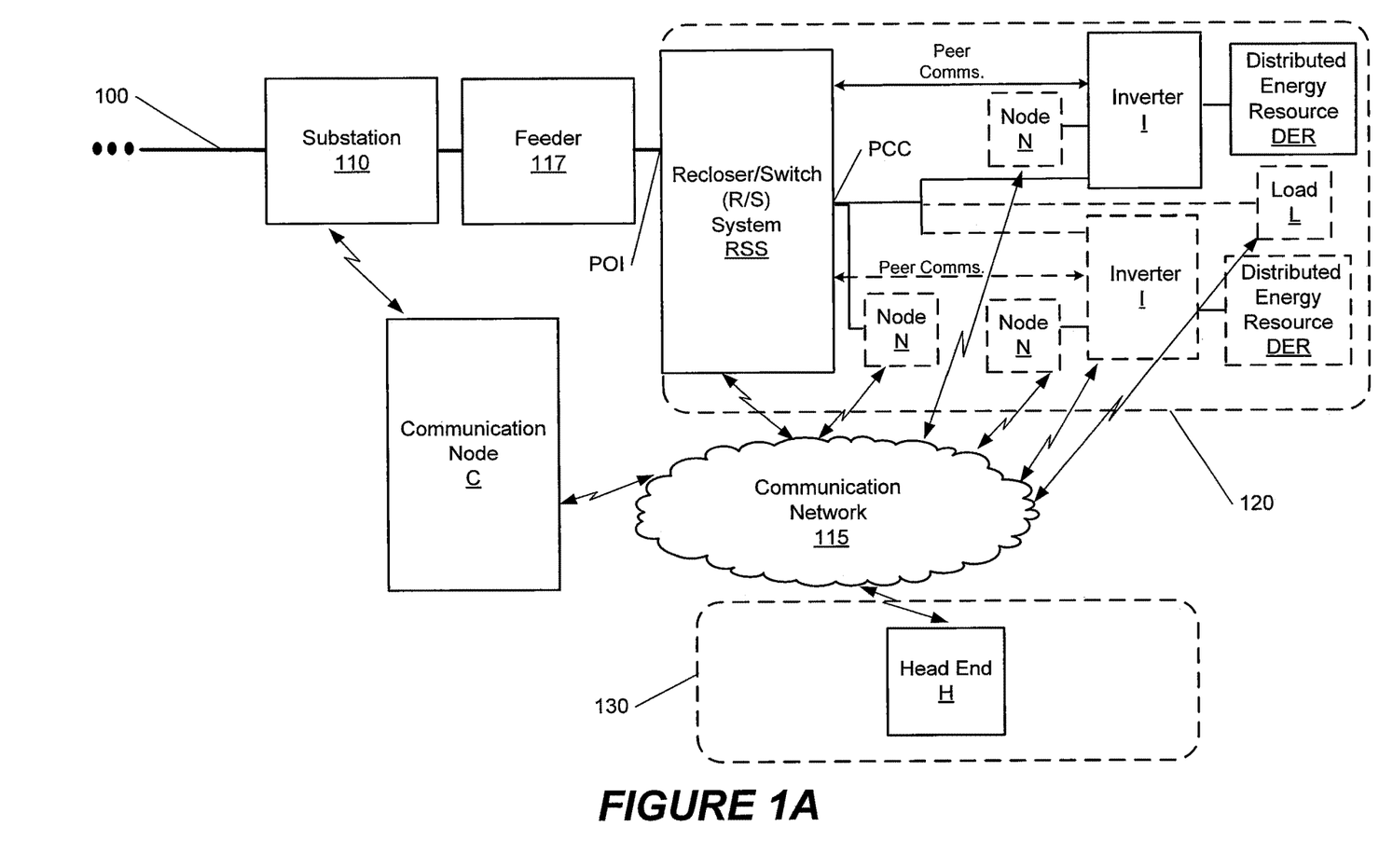
FIG. 1A is a schematic illustration of a grid and a microgrid, according to various embodiments.

Referring now to FIG. 1A, a schematic illustration is provided of a grid 100 and a microgrid 120, according to various embodiments. The grid 100 may be a utility grid such as an electric grid. A substation 110 of the grid 100 may be an electric utility substation that includes one or more transformers. Although one substation 110 is illustrated in FIG. 1A, the grid 100 may, in some embodiments, include more than one (e.g., two, three, four, five, dozens, hundreds, or more) substations 110.

A feeder 117 may be connected between output terminals of the substation 110 and input terminals of the microgrid 120. The feeder 117 may be referred to as a "distribution feeder" or a "distribution feeder circuit." A plurality of distribution feeder circuits may be connected to the substation 110 and may extend in different directions to serve various customers. The feeder 117 and the microgrid 120 may be referred to as being "downstream" from the substation 110.

The substation 110 and the microgrid 120 may communicate with a communication network 115. The communication network 115 may include one or more wireless or wired communication networks, such as a local area network (e.g., Ethernet or WiFi) or a Wide Area Network (e.g., a cellular network, Ethernet, or a fiber (such as fiber-optic) network).

In some embodiments, the microgrid 120 may include apparatuses, such as nodes N, that transmit and receive data via the communication network 115. For example, the nodes N of the microgrid 120 may communicate with each other via the communication network 115. Additionally or alternatively, the nodes N of the microgrid 120 may communicate via the communication network 115 with nodes that are external to the microgrid 120. As an example, the nodes N of the microgrid 120 may communicate via the communication network 115 to a communication node C that is in the field of the grid 100. For example, the communication node C may be at or adjacent the substation 110, and may, in some embodiments, control operations of the substation 110. Moreover, the nodes N of the microgrid 120 may optionally communicate via the communication network 115 with a centralized location such as a distribution control center of an electric utility or a head end H of an electric utility data center 130. The nodes N may be communication nodes C and/or microgrid controllers.

The communication node C may, in some embodiments, receive data from, and/or transmit control commands to, the substation 110. Additionally or alternatively, a communication node C in the field may be spaced apart from the substation 110 and may receive data from, and/or transmit control commands to, the substation 110 via the communication network 115. Accordingly, although one communication node C is illustrated in FIG. 1A, more than one (e.g., two, three, four, or more) communication nodes C may be in the field of the grid 100.

One or more communication nodes C may communicate with one or more electric grid devices that are connected to the grid 100, using wireless communications (e.g., 3G/LTE, other cellular, WiFi, etc.) or wired communications (e.g., Power Line Carrier (PLC), Ethernet, serial, Universal Serial Bus (USB), etc.). Additionally or alternatively, the one or more communication nodes C may communicate with the distribution control center, or with the head end system H of the electric utility data center 130, via the communication network 115. An electric grid device may be, for example, an electric utility meter, a transformer, a light (e.g., a street light), an electric grid control device, an electric grid protection device, a recloser, a line sensor, a weather sensor, an Advanced Metering Infrastructure (AMI) device, an analog or digital sensor connected to an electric utility asset, an electric generator, an electric turbine, an electric boiler, an electric vehicle, a home appliance, a battery storage device, a capacitor device, a solar power device, a smart generation device, an intelligent switching device, an emission monitoring device, or a voltage regulator. In some embodiments, an electric grid device may be on a distribution line of the grid 100.

Referring still to FIG. 1A, a detailed schematic view of the microgrid 120 is illustrated, according to various embodiments. Specifically, FIG. 1A illustrates that the microgrid 120 includes a recloser/switch system RSS that is at a Point of Common Coupling (PCC) of the microgrid 120. The recloser/switch system RSS is communicatively coupled to an inverter I. For example, the recloser/switch system RSS may have peer-to-peer communications with the inverter I. Accordingly, rather than relying on centralized control/communications via the head end H, the recloser/switch system RSS may communicate directly with the inverter I regarding making a change in a control state of the inverter I.

As an example, peer communications may be provided via a wire that directly connects the recloser/switch system RSS to the inverter I. In some embodiments, this wired connection for peer communications may be a fiber or Ethernet connection. Additionally or alternatively, the recloser/switch system RSS and the inverter I may communicate with each other wirelessly, such as via the communication network 115. In some embodiments, the recloser/switch system RSS and the inverter I may be coupled to respective nodes N that communicate via the communication network 115. The nodes N may be internal to or external to (e.g., adjacent) the recloser/switch system RSS and the inverter I.

In some embodiments, the recloser/switch system RSS may be communicatively coupled to a plurality of inverters I. Accordingly, FIG. 1A illustrates an inverter I that is outlined using a dashed line to indicate that it is an optional second inverter I. Moreover, the recloser/switch system RSS may, in some embodiments, be communicatively coupled to three or more inverters I.

The recloser/switch system RSS is coupled to both the PCC of the microgrid 120 and to a Point of Interconnection (POI) with the grid 100. In some embodiments, the recloser/switch R/S (FIG. 1D) of the recloser/switch system RSS is a motor-operated switch, where one side of the switch is connected to the PCC and the other side of the switch is connected to the POI. The switch may be referred to as an "islanding switch," as it can island the microgrid 120 from the grid 100.

Each inverter I of the microgrid 120 is connected to a respective distributed energy resource DER. A distributed energy resource DER may be any type of generator. For example, a distributed energy resource DER may be a battery, a solar (i.e., photovoltaic (PV)) generation system, a wind power generation system, or a diesel generator. Other examples of a distributed energy resource DER include a flywheel, a controllable load, a capacitor, and any other energy storage system. Accordingly, the inverter I may be referred to as an inverter of an energy storage system. In some embodiments, multiple devices may be behind a single inverter I. As an example, a single inverter I may be the inverter for both a battery and a solar generation system. Each inverter I may be configured to convert a variable Direct Current (DC) output of one or more distributed energy resources DER into a utility frequency Alternating Current (AC) that can be fed into a commercial electrical grid (e.g., the grid 100) or be used by a local, off-grid electrical network.

The microgrid 120 may optionally include one or more loads L. In some embodiments, a load L may communicate with the communication network 115. As the nodes N and load L of FIG. 1A are optional, however, some or all of them may be omitted.

Figure 1B:
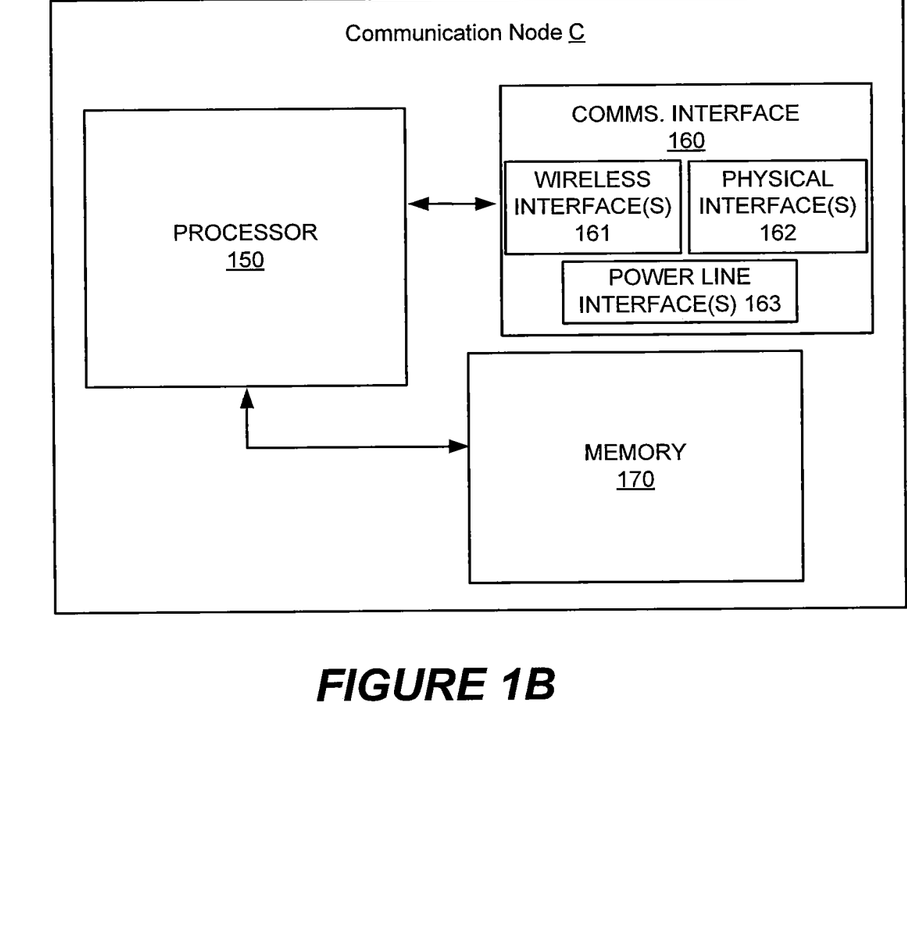
FIG. 1B is a block diagram of a communication node of FIG. 1A, according to various embodiments.

Referring now to FIG. 1B, a block diagram is provided of a communication node C of FIG. 1A, according to various embodiments. The communication node C may include a processor 150, a network interface 160, and a memory 170. The processor 150 may be coupled to the network interface 160. The processor 150 may be configured to communicate with other communication nodes C, a node N, an electric grid device, and/or devices at a distribution control center, the substation 110, and/or the electric utility data center 130, via the network interface 160. The network interface 160 may be referred to herein as a "comms. interface" or a "communications interface."

For example, the network interface 160 may include one or more wireless interfaces 161 (e.g., 3G/LTE, other cellular, WiFi, Global Positioning System (GPS) interfaces, etc.) and one or more physical interfaces 162 (e.g., Ethernet, serial, USB interfaces, etc.). Moreover, the network interface 160 may optionally include one or more power line interfaces 163 (e.g., Low Voltage (LV) or Mid Voltage (MV) PLC).

Accordingly, the communication node C may, in some embodiments, have multiple integrated communications options. For example, the communication node C may provide PLC, WiFi, Zigbee, Z-wave communications, or other communications via the network interface 160 to the substation 110, and may provide cellular communications or other communications to the grid 100.

Moreover, the communication node C may have a modular design that allows the communication node C to use a variety of communications technologies, and to therefore not be limited exclusively to one communications technology, such as PLC communications. The communication node C may be referred to as having a modular design because communications circuitry of the network interface 160 may include integrated circuits provided on respective plug-and-play cards that can be easily added to and removed from (e.g., removed and replaced with a new and/or different card providing improved/different functionality). As an example, the communications circuitry of the network interface 160 may include a PLC card that may be replaced with or supplemented by a card that provides WiFi communications. Various other types of cards may also be used that are modular/interchangeable from one communication node C to the next.

Referring still to FIG. 1B, the memory 170 may be coupled to the processor 150. The memory 170 may also store instructions/algorithms used by the processor 150. Moreover, a node N at the microgrid 120 may include any of the circuitry/functionality of the communication node C. A node N at the PCC may control the microgrid 120 and thus may be referred to herein as a "microgrid controller."

The communication node C may include core hardware components such as a power supply, 10 MHz or higher speed processor(s), and 1 Megabyte (MB) or more of RAM. The communication node C may also include core applications, such as CPU/memory/OS management applications, port/device drivers, router/Internet Protocol (IP) services, network management services, basic protocol support, SCADA, custom Application Programming Interface (API)/applications, and device security services. Moreover, the communication node C may include virtual applications, such as a virtual machine (e.g., a Java Virtual Machine), message bus(es), message broker(s), protocol adapters, mini-SCADA, open-standards API, and third-party applications (e.g., security/analytics applications). For example, the communication node C may support Distributed Network Protocol (DNP) (e.g., DNP 3.0), Modbus, and Message Queue Telemetry Transport (MQTT) protocols. The core applications may use such software as C++/Linux, and the virtual applications may use such software as Java/Linux.

Figure 1C:
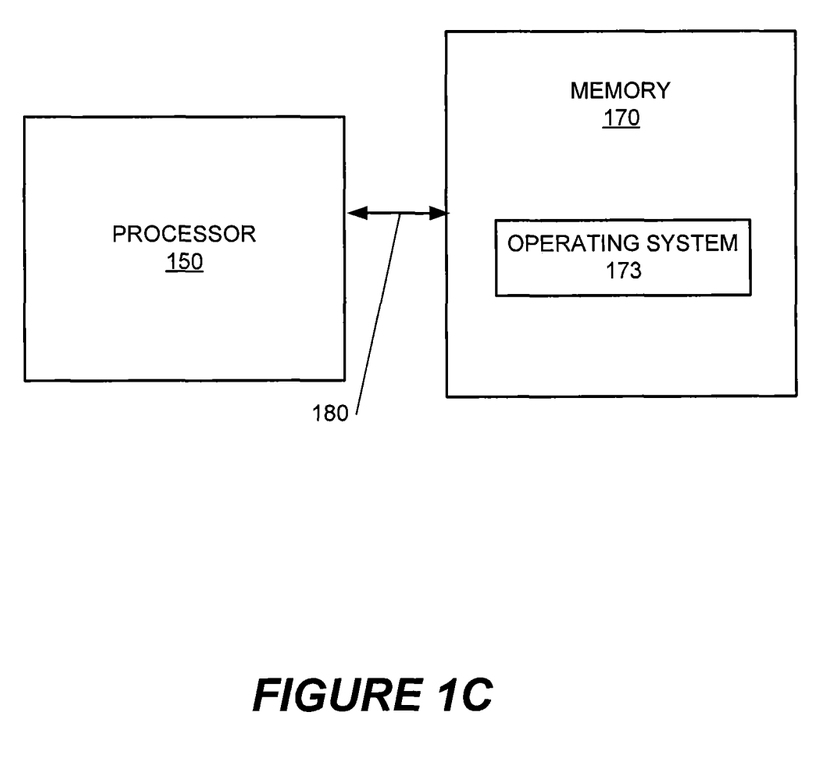
FIG. 1C is a block diagram that illustrates details of an example processor and memory that may be used in accordance with various embodiments.

Referring now to FIG. 1C, a block diagram is provided that illustrates details of an example processor 150 and memory 170 of a communication node C (or a node N) that may be used in accordance with various embodiments. The processor 150 communicates with the memory 170 via an address/data bus 180. The processor 150 may be, for example, a commercially available or custom microprocessor. Moreover, the processor 150 may include multiple processors. The memory 170 is representative of the overall hierarchy of memory devices containing the software and data used to implement various functions of communication node C as described herein. The memory 170 may include, but is not limited to, the following types of devices: cache, ROM, PROM, EPROM, EEPROM, flash, Static RAM (SRAM), and Dynamic RAM (DRAM).

As shown in FIG. 1C, the memory 170 may hold various categories of software and data, such as an operating system 173. The operating system 173 controls operations of a communication node C (or a node N). In particular, the operating system 173 may manage the resources of a communication node C (or a node N) and may coordinate execution of various programs by the processor 150.

Figure 1D:
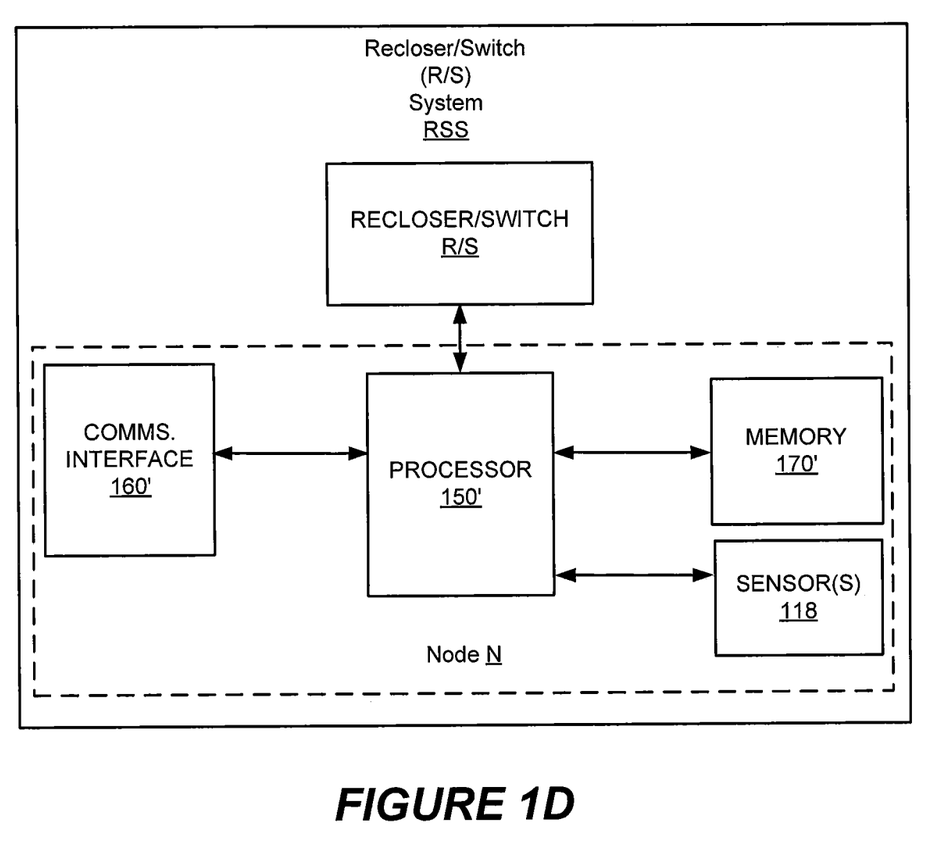
FIG. 1D is a block diagram of a recloser/switch system of FIG. 1A, according to various embodiments.

Referring now to FIG. 1D, a block diagram is provided of the recloser/switch system RSS of FIG. 1A, according to various embodiments. The recloser/switch system RSS may include a recloser/switch R/S, which may be controlled by a processor 150'. In some embodiments, the recloser/switch R/S may be a motor-operated switch, and the motor operations of the recloser/switch R/S may be controlled by the processor 150'. The recloser/switch system RSS may also include a communications/network interface 160' that is configured to communicate with the inverter I via a wired or wireless connection. Additionally or alternatively, the communications/network interface 160' may be configured to communicate with a communication node C (or a node N).

In some embodiments, the recloser/switch system RSS may include a node N that includes the processor 150' and the communications/network interface 160'. The node N of the recloser/switch system RSS may also include a memory 170' and one or more sensors 118. The processor 150', the communications/network interface 160', and the memory 170' may include the circuitry/functionality of the processor 150, the network interface 160, and the memory 170, respectively, of FIG. 1B.

The recloser/switch R/S may be located at or near the top of a utility pole, whereas the processor 150' of the recloser/switch system RSS may be in a box (e.g., a cabinet or other enclosure) that is located closer to the bottom of the utility pole. Accordingly, the processor 150' that controls the recloser/switch R/S may be electrically connected to the recloser/switch R/S by a wire but physically spaced apart from the recloser/switch R/S vertically on the same utility pole. The recloser/switch R/S may break power lines, and thus may be in a high voltage or mid voltage (e.g., voltages between 4,000 Volts and about 69,000 Volts) zone of the utility pole. The sensor(s) 118, as well as one or more actuators, may also be in the high voltage or mid voltage zone of the utility pole. The box that includes the processor 150' may further include the communications/network interface 160' and the memory 170', and may be in a lower voltage zone of the utility pole.

Figure 1E:
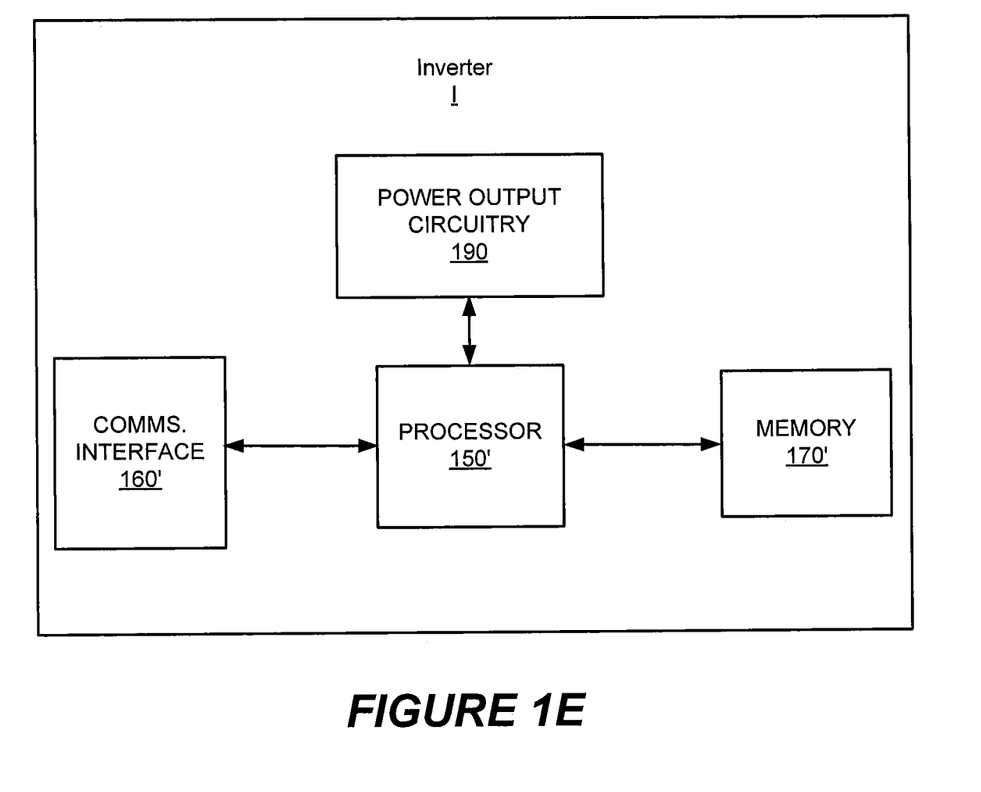
FIG. 1E is a block diagram of an inverter of FIG. 1A, according to various embodiments.

FIG. 1E is a block diagram of the inverter I of FIG. 1A, according to various embodiments. The inverter I includes power output circuitry 190 that is configured to perform power inverter operations. For example, the power output circuitry 190 may be configured to convert a variable DC output of one or more distributed energy resources DER into a utility frequency AC that can be fed into a commercial electrical grid, such as the grid 100, or can be used by a local, off-grid electrical network. Moreover, as with the recloser/switch system RSS, the inverter I may include a processor 150', a communications/network interface 160', and a memory 170'.

The processor 150' of the inverter I may control the operations of the power output circuitry 190. The communications/network interface 160' of the inverter I may be configured to communicate with the recloser/switch system RSS via a wired or wireless connection. Additionally or alternatively, the communications/network interface 160' may be configured to communicate with a communication node C (or a node N).

Figure 2A:
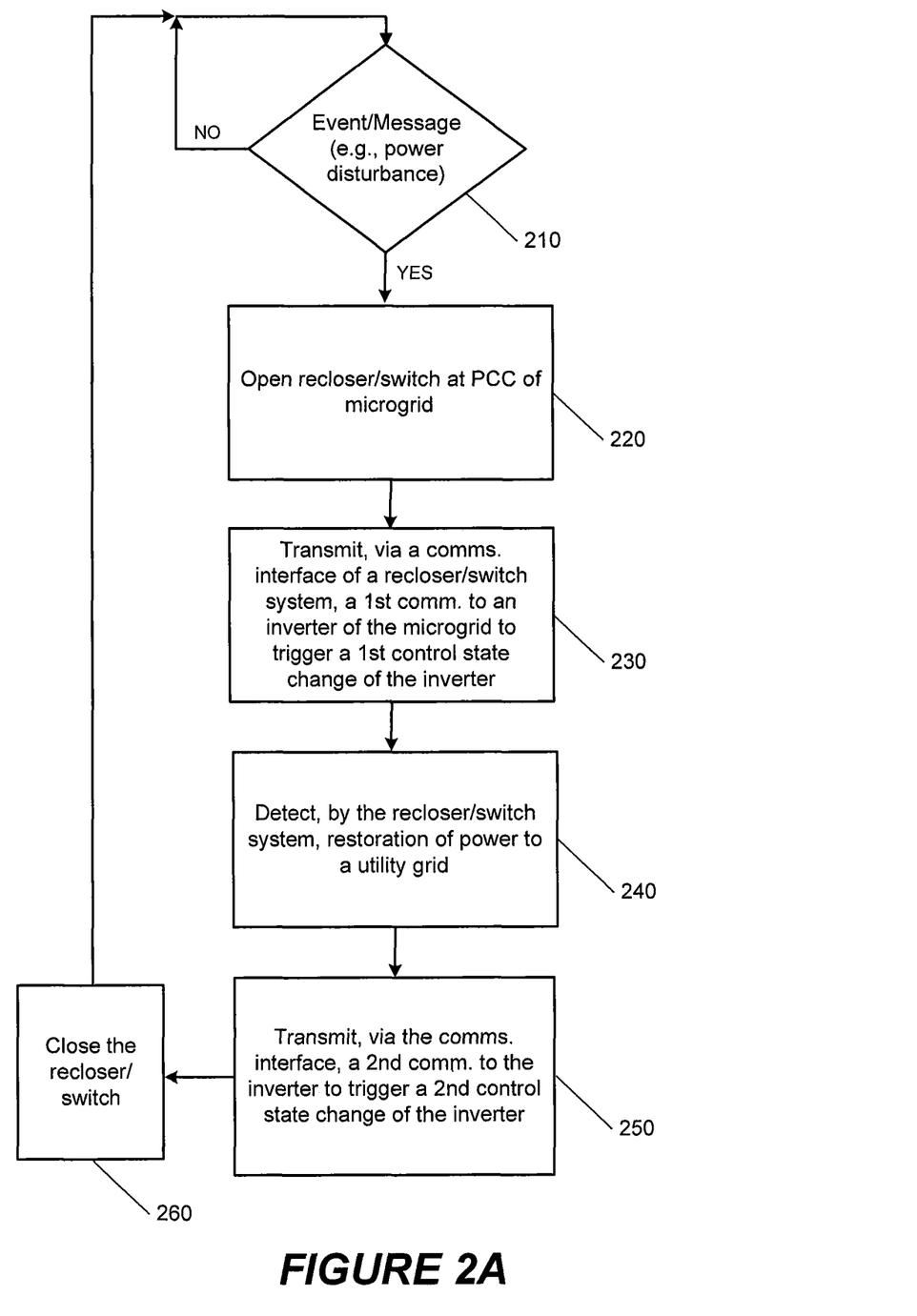
FIGS. 2A, 2C, and 2D are flowcharts illustrating operations of the recloser/switch system of FIG. 1A, according to various embodiments.
Figure 2B:
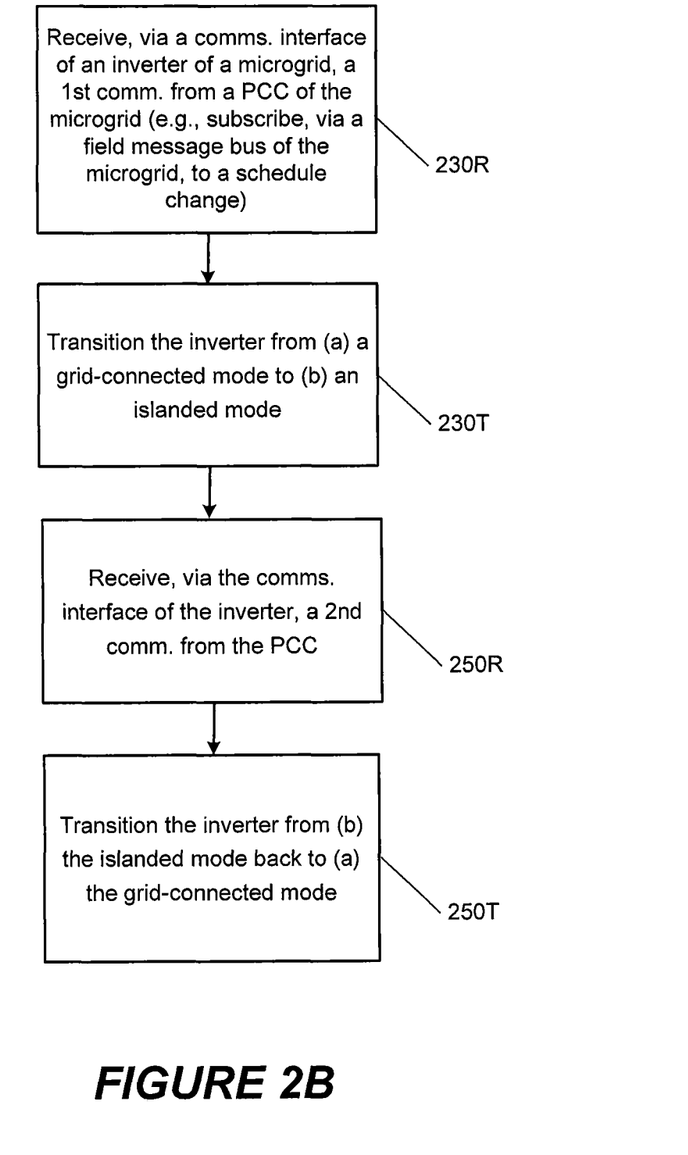
FIG. 2B is a flowchart illustrating operations of the inverter of FIG. 1A, according to various embodiments.
Figure 2C:
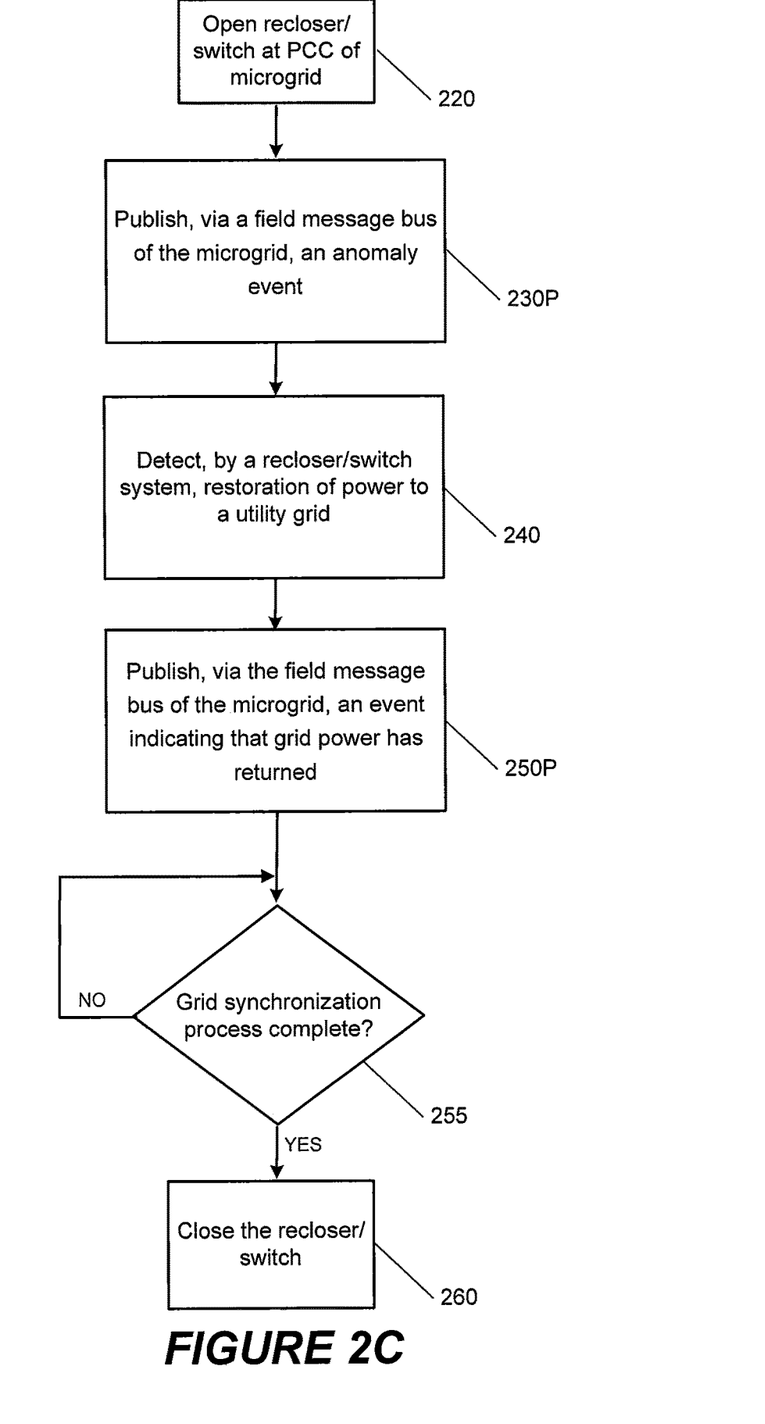
Figure 2D:
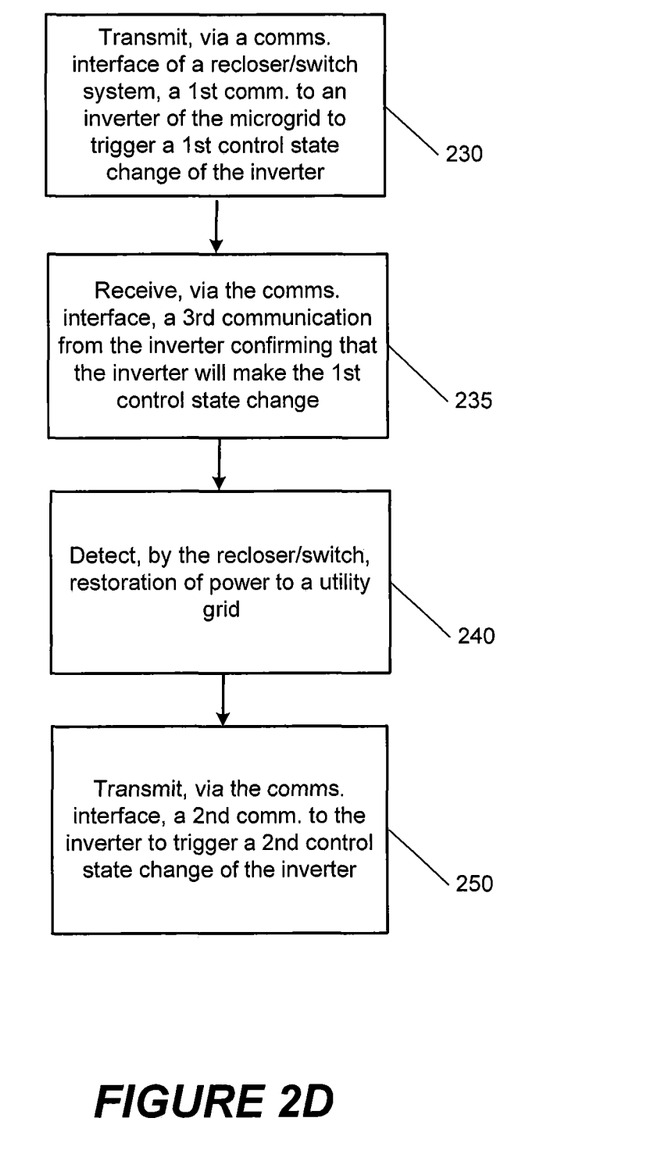

Referring now to FIGS. 2A, 2C, and 2D, flowcharts are provided illustrating operations of the recloser/switch system RSS of FIG. 1A, according to various embodiments. Also, FIG. 2B is a flowchart illustrating operations of the inverter I of FIG. 1A, according to various embodiments. Referring to FIG. 2A, operations of the recloser/switch system RSS are provided. The operations include opening (Block 220) the recloser/switch R/S that is at the PCC of the microgrid 120.

For example, the recloser/switch R/S may open (Block 220) in response to an event and/or a message (Block 210). As an example, the recloser/switch R/S may open (Block 220) in response to detecting a power disturbance of the utility grid 100. For example, the power disturbance may be an unscheduled power disturbance that is detected by the sensor(s) 118 (FIG. 1D). Alternatively, the recloser/switch system RSS may receive, via the communications/network interface 160' (FIG. 1D) of the recloser/switch system RSS, a command to intentionally transition to an islanded mode independently of any power disturbance of the utility grid 100. The recloser/switch R/S may then open (Block 220) in response to the command. In some embodiments, the recloser/switch system RSS may receive the command to intentionally transition to the islanded mode via a field message bus. Moreover, in some embodiments, the event may be a security event such as the detection of a potential security threat.

The operations of the recloser/switch system RSS also include transmitting (Block 230), via the communications/network interface 160' of the recloser/switch system RSS, a first communication to the inverter I of the microgrid 120 to trigger a first control state change of the inverter I. For example, operations of transmitting (Block 230) the first communication may include transmitting, in response to opening (Block 220) the recloser/switch R/S, a first command to transition the inverter I from a grid-connected mode to an islanded mode. The first communication/command may be a peer-to-peer communication between the recloser/switch system RSS and the inverter I. Moreover, in some embodiments, the recloser/switch system RSS may transmit the first communication/command to a plurality of inverters I via a peer-to-multipeer communication. Accordingly, operations of transmitting (Block 230) the first command may include transmitting the first command to a plurality of inverters I of the microgrid 120, in response to opening (Block 220) the recloser/switch R/S.

The microgrid 120 may benefit from accessing data at both sides of the recloser/switch R/S and quickly communicating that data with a time-accurate profile/schedule to the inverter(s) I. In particular, high-speed communications may be beneficial for quickly communicating to the inverter(s) I and enabling the inverter(s) to harmonize to the data that is communicated. Specifically, the interoperability and common data model of a field message bus may be very helpful for such high-speed communications. For example, the following patent applications, the entire disclosures of which are hereby incorporated by reference, discuss a field message bus: U.S. patent application Ser. No. 14/264,757, filed on Apr. 29, 2014, entitled Methods of Processing Data Corresponding to a Device that Corresponds to a Gas, Water, or Electric Grid, and Related Devices and Computer Program Products, and U.S. patent application Ser. No. 14/270,914, filed on May 6, 2014, entitled Communication Nodes and Sensor Devices Configured to Use Power Line Communication Signals, and Related Methods of Operation. In contrast, communications that are either centralized or completely at the edge of the system may be too slow.

Moreover, the operations of the recloser/switch system RSS include detecting (Block 240), by the recloser/switch system RSS (e.g., by the sensor(s) 118), restoration of power to the utility grid 100. The operations also include transmitting (Block 250), via the communications/network interface 160' of the recloser/switch system RSS, a second communication to the inverter I to trigger a second control state change of the inverter I. Although the operations of Blocks 220-250 may occur in combination sequentially, the present inventive entity appreciates that the operations of Blocks 220, 230 may optionally occur independently of the operations of Blocks 240, 250, and vice versa. Accordingly, some embodiments may focus on the sequence of Blocks 220 and 230 or on the sequence of Blocks 240 and 250, without requiring a combined sequence that includes all of Blocks 220-250. For example, Blocks 220 and 230 may be grouped and referred to as transitioning from (a) a grid-connected mode to (b) an islanded mode, whereas Blocks 240 and 250 may grouped and referred to as transitioning from (b) an islanded mode to (a) a grid-connected mode.

In some embodiments, operations of transmitting (Block 250) the second communication may include transmitting, in response to detecting (Block 240) the restoration of power to the utility grid 100, a second command to transition the inverter I from an islanded mode back to a grid-connected mode. Moreover, transmitting (Block 250) the second command may include transmitting the second command to a plurality of inverters I, in response to detecting (Block 240) the restoration of power to the utility grid 100. Accordingly, the operations of transmitting (Block 250) may involve a peer-to-multipeer transmission.

When grid power is restored (Block 240), the recloser/switch system RSS may tell a control system (e.g., one of the nodes N) that power of the grid 100 is back on and to start preparing the microgrid 120 to reconnect to the grid 100, before the recloser/switch system RSS tells inverter(s) I (Block 250) about grid power restoration.

Referring still to FIG. 2A, operations of the recloser/switch system RSS may include closing (Block 260) the recloser/switch R/S to reconnect the microgrid 120 to the utility grid 100. The operations of the recloser/switch system RSS may then return to waiting for an event/message (Block 210) that triggers the opening (Block 220) of the recloser/switch R/S. Moreover, the present inventive entity appreciates that the operations of Blocks 210-260 may be performed under the control of the processor 150' of FIG. 1D.

In some embodiments, the operations of Blocks 210-260 may be referred to as occurring at the PCC of the microgrid 120.

In embodiments where the microgrid 120 includes a plurality of inverters I, the inverters I may be prioritized with respect to each other, to determine which of the inverters I will take over when disconnected from the grid 100. For example, a field message bus may have configured priorities for the inverters I. Prioritization could be based on a Quality of Service (QoS) rank of the inverters I. The field message bus thus has the ability to prioritize (e.g., order/rank) which inverter I will take over. Accordingly, the field message bus can coordinate the inverters I.

As an example, the microgrid 120 may include multiple distributed energy resources DER, such as multiple batteries, that are behind the recloser/switch R/S. It may be desirable to prioritize the batteries for switching to a voltage-source mode so that the batteries do not fight each other and potentially cause a system failure. Accordingly, one of the batteries may be assigned the highest priority. If that battery does not succeed, then the microgrid 120 will transition to the next-highest-priority battery. In contrast, if the microgrid 120 instead used a single predetermined islandable battery, then the remaining batteries would always be in a current-source mode and would never switch to a different mode. With various embodiments herein, however, all batteries have the capability to switch, as their inverters I are configured to receive a command from the recloser/switch R/S, rather than from the point of common coupling of a battery/inverter. The point of common coupling PCC of the microgrid 120, instead of the point of common coupling of a battery/inverter, controls the batteries/inverters.

As all of the batteries are switchable, and thus not limited to predetermined roles, the behavior of the batteries may be dynamically changed instead of using a fixed setting. Moreover, faster switching may result in less degradation of equipment and additional system reliability. For example, communication between the recloser/switch R/S and a battery/inverter is sufficiently fast that it allows switching between different modes, which may protect the island from blackstarting. If, on the other hand, a delay of more than 100 milliseconds occurs for communications between the recloser/switch R/S and a battery/inverter, then an outage may result.

Priorities for the batteries could be set by a utility service provider for the microgrid 120, or could be set by a customer of the utility service provider. Accordingly, either the utility service provider or the customer could determine the order in which the batteries will become the voltage source when the microgrid 120 disconnects from the grid 100. This ranking/priority may be on the communications protocol of a field message bus that is used by the microgrid 120. A centralized controller may be unnecessary because the communications may be either peer-to-peer or peer-to-multipeer. Moreover, when the microgrid 120 returns to the grid 100, there may be a handshake between the recloser/switch R/S and the battery/inverter to move back to current-source mode. Quickly switching back to the current-source mode upon reconnecting to the grid 100 may reduce the risk of equipment overheating, failure.

Referring again to Block 210, as used herein, although the words "power disturbance" may encompass a power outage, a power disturbance of the grid 100 is not limited to a power outage. Rather, a power disturbance may, in some embodiments, refer to a power anomaly of the grid 100 that is not an outage. Accordingly, the recloser/switch R/S may open (Block 220) in response to the recloser/switch system RSS detecting a power anomaly. For example, a transient that trips the recloser/switch R/S could be referred to as a power disturbance. Moreover, the grid 100 could have a voltage or frequency issue that would be considered a power disturbance, even if it does not result in an outage. The voltage or frequency issue could be a voltage or frequency that goes undesirably high (or, alternatively, goes undesirably low). In particular, it may be beneficial to disconnect the microgrid 120 from the grid 100 before a power outage occurs. As an example, it may be beneficial to open the recloser/switch R/S when a voltage drops below (or increases above) a predetermined percentage (e.g., 70%) of nominal.

Referring to FIG. 2B, operations of the inverter I are illustrated that correspond to operations in Blocks 230 and 250 of FIG. 2A of the recloser/switch system RSS. Operations of the inverter I include receiving (Block 230R), via a communications interface of the inverter I of the microgrid 120, a first communication from the PCC of the microgrid 120. When the microgrid 120 is in either a grid-connected mode or an islanded mode, schedules may be provided to the distributed energy resources DER via a field message bus of the microgrid 120. For example, receiving (Block 230R) the first communication may include subscribing, via the field message bus, to a schedule change that is due to an anomaly event. The schedule change may be referred to herein as an "alarm." The communications interface used in Block 230R may be the communications/network interface 160' of FIG. 1E. Moreover, the first communication of Block 230R may be the first communication that is transmitted in Block 230 of FIG. 2A. In response to receiving (Block 230R) the first communication, the inverter I transitions (Block 230T) from a grid-connected mode to an islanded mode.

Operations of the inverter I also include receiving (Block 250R), via the communications interface of the inverter I, a second communication from the PCC. As discussed with respect to Block 230R, the communications interface used in Block 250R may be the communications/network interface 160' of FIG. 1E. Moreover, the second communication of Block 250R may be the second communication that is transmitted in Block 250 of FIG. 2A. In response to receiving (Block 250R) the second communication, the inverter I transitions (Block 250T) from the islanded mode back to the grid-connected mode.

Although the operations of Blocks 230R, 230T, 250R, and 250T may occur in combination sequentially, the present inventive entity appreciates that the operations of Blocks 230R, 230T may optionally occur independently of the operations of Blocks 250R, 250T, and vice versa. Accordingly, some embodiments may focus on the sequence of Blocks 230R and 230T or on the sequence of Blocks 250R and 250T, without requiring a combined sequence that includes all of Blocks 230R, 230T, 250R, and 250T. For example, Blocks 230R and 230T may be grouped and referred to as transitioning the inverter I from (a) a grid-connected mode to (b) an islanded mode, whereas Blocks 250R and 250T may grouped and referred to as transitioning the inverter I from (b) an islanded mode to (a) a grid-connected mode.

The inverter I that performs the operations of FIG. 2B may be an inverter of a distributed energy resource DER. Moreover, the first and second communications (Blocks 230R and 250R) of FIG. 2B may be first and second peer-to-peer or peer-to-multipeer communications, respectively. In some embodiments, transitioning (Block 230T) from the grid-connected mode may include changing from a current-source grid-following mode (or, alternatively, a voltage-source grid-following mode) of the inverter I of the distributed energy resource DER to a voltage-source isochronous mode of the inverter I of the distributed energy resource DER, in response to the first peer-to-peer or peer-to-multipeer communication. Transitioning (Block 250T) from the islanded mode may then include changing from the voltage-source isochronous mode of the inverter I of the distributed energy resource DER to another mode of the inverter I of the distributed energy resource DER, in response to the second peer-to-peer or peer-to-multipeer communication. The other mode may be a current-source grid-following mode or a voltage-source grid-following mode.

The words "grid-following mode," as used herein, refer to a grid-connected mode that could be either a current-source mode or a voltage-source mode. Accordingly, an inverter I of the microgrid 120 may transition from an islanded mode to either (i) a current-source grid-following mode or (ii) a voltage-source grid-following mode. In the isochronous mode, the inverter I may provide voltage and frequency to the power system. Alternatively, the inverter I could provide Watts and VARS in the isochronous mode instead of providing voltage and frequency. Moreover, the isochronous mode may be a very low impedance mode.

In some embodiments, the distributed energy resource DER to which the inverter I is coupled may be the only islandable distributed energy resource DER that is controlled by the PCC. Alternatively, the distributed energy resource DER to which the inverter I is coupled may be one distributed energy resource DER among a plurality of islandable distributed energy resources DER that are controlled by the PCC.

The operations of FIG. 2B may, in some embodiments, be performed under the control of the processor 150' of FIG. 1E. Alternatively, the operations of FIG. 2B may be performed under the control of a processor 150/150' of a node N that is adjacent the inverter I.

Referring to FIG. 2C, operations by the recloser/switch system RSS of transmitting (Block 230) the first communication may optionally include publishing (Block 230P), via a field message bus of the microgrid 120, an anomaly event, in response to opening (Block 220) the recloser/switch R/S. In some embodiments, the recloser/switch system RSS may notify each of (i) the inverter I, (ii) a controller 150/150' of the microgrid 120, and (iii) a utility SCADA system of the anomaly event. Moreover, operations by the recloser/switch system RSS of transmitting (Block 250) the second communication may optionally include publishing (Block 250P), via a field message bus of the microgrid 120, an event indicating that grid power has returned, in response to detecting (Block 240) the restoration of power to the utility grid 100. After publishing (Block 250P) the event indicating that grid power has returned, operations of the recloser/switch system RSS may include awaiting (Block 255) completion of a grid synchronization process. Moreover, after the completion of the grid synchronization process, the recloser/switch R/S closes (Block 260) to reconnect the microgrid 120 to the utility grid 100.

Referring to FIG. 2D, operations by the recloser/switch system RSS may optionally include, after transmitting (Block 230) the first communication, and before transmitting (Block 250) the second communication, receiving (Block 235), via the communications interface of the recloser/switch system RSS, a third communication from the inverter I confirming that the inverter I will make the first control state change.

The present inventive entity appreciates that the peer communications of various embodiments herein may allow for efficient, high-speed transitions of microgrid equipment from a grid-connected mode to an islanded mode and/or vice versa. In particular, the communications and controls that are described herein for (i) transitioning from a grid-connected mode to an islanded mode and/or for (ii) transitioning from an islanded mode to a grid-connected mode may improve communication speed and help protect microgrid equipment from stress or other causes/forms of unreliability.

Specific example embodiments of the present inventive concepts are described with reference to the accompanying drawings. The present inventive concepts may, however, be embodied in a variety of different forms and should not be construed as limited to the embodiments set forth herein. Rather, these embodiments are provided so that this disclosure will be thorough and complete and will fully convey the scope of the present inventive concepts to those skilled in the art. In the drawings, like designations refer to like elements. It will be understood that when an element is referred to as being "connected," "coupled," or "responsive" to another element, it can be directly connected, coupled or responsive to the other element or intervening elements may be present. Furthermore, "connected," "coupled," or "responsive" as used herein may include wirelessly connected, coupled, or responsive.

The terminology used herein is for the purpose of describing particular embodiments only and is not intended to be limiting of the present inventive concepts. As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. The symbol "/" is also used as a shorthand notation for "and/or."

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will also be understood that although the terms "first" and "second" may be used herein to describe various elements, these elements should not be limited by these terms. These terms are only used to distinguish one element from another element. Thus, a first element could be termed a second element, and similarly, a second element may be termed a first element without departing from the teachings of the present inventive concepts.

Example embodiments of the present inventive concepts may be embodied as nodes, devices, apparatuses, and methods. Accordingly, example embodiments of the present inventive concepts may be embodied in hardware and/or in software (including firmware, resident software, microcode, etc.). Furthermore, example embodiments of the present inventive concepts may take the form of a computer program product comprising a non-transitory computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Example embodiments of the present inventive concepts are described herein with reference to flowchart and/or block diagram illustrations. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the functions specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

In the specification, various embodiments of the present inventive concepts have been disclosed and, although specific terms are employed, they are used in a generic and descriptive sense only and not for purposes of limitation. Those skilled in the art will readily appreciate that many modifications are possible for the disclosed embodiments without materially departing from the teachings and advantages of the present inventive concepts. The present inventive concepts are defined by the following claims, with equivalents of the claims to be included therein.

What is claimed is:

1. A method comprising:
opening a switch at a point of common coupling of a microgrid;
transmitting, via a wired or wireless connection of a switch system comprising the switch, a first communication to an inverter of the microgrid to trigger a first control state change of the inverter;
detecting, by the switch system, restoration of power to a utility grid; and
transmitting, via the wired or wireless connection of the switch system, a second communication to the inverter to trigger a second control state change of the inverter,
wherein transmitting the second communication comprises publishing, via a message bus of the microgrid, an event indicating that grid power has returned, in response to detecting the restoration of power to the utility grid.

2. The method of claim 1, wherein:
transmitting the first communication comprises transmitting, in response to opening the switch, a first command to transition the inverter from a grid-connected mode to an islanded mode; and
transmitting the second communication comprises transmitting, in response to detecting the restoration of power to the utility grid, a second command to transition the inverter from the islanded mode back to the grid-connected mode.

3. The method of claim 2, wherein:
transmitting the first command comprises transmitting the first command to a plurality of inverters of the microgrid, in response to opening the switch; and
transmitting the second command comprises transmitting the second command to the plurality of inverters, in response to detecting the restoration of power to the utility grid.

4. The method of claim 1, wherein the first and second communications comprise peer communications.

5. The method of claim 1, further comprising:
after transmitting the first communication, and before transmitting the second communication, receiving, via the wired or wireless connection, a third communication from the inverter confirming that the inverter will make the first control state change.

6. The method of claim 1, wherein opening the switch comprises opening the switch in response to detecting a power disturbance of the utility grid.

7. The method of claim 1, further comprising:
receiving, at the switch system, a command to intentionally transition to an islanded mode independently of any power disturbance of the utility grid, wherein opening the switch comprises opening the switch in response to the command.

8. The method of claim 7, wherein receiving the command to intentionally transition to the islanded mode comprises receiving the command via the message bus of the microgrid.

9. The method of claim 1, wherein transmitting the first communication comprises publishing, via the message bus of the microgrid, an anomaly event, in response to opening the switch.

10. The method of claim 9, wherein the switch system notifies the inverter, a controller of the microgrid, and a utility SCADA system of the anomaly event.

11. The method of claim 1, further comprising:
after publishing the event indicating that grid power has returned, awaiting completion of a grid synchronization process; and
after the completion of the grid synchronization process, closing the switch to reconnect the microgrid to the utility grid.

12. A method comprising:
receiving, via a wired or wireless connection of an inverter of a microgrid, a first peer communication;
transitioning the inverter from a grid-connected mode to an islanded mode, in response to the first peer communication;
receiving, via the wired or wireless connection of the inverter, a second peer communication; and
transitioning the inverter from the islanded mode back to the grid-connected mode, in response to the second peer communication.

13. The method of claim 12, wherein:
the inverter comprises an inverter of a distributed energy resource;
transitioning from the grid-connected mode comprises changing from a current-source grid-following mode of the inverter of the distributed energy resource to a voltage-source isochronous mode of the inverter of the distributed energy resource, in response to the first peer communication; and
transitioning from the islanded mode comprises changing from the voltage-source isochronous mode of the inverter of the distributed energy resource to another mode of the inverter of the distributed energy resource, in response to the second peer communication.

14. The method of claim 13, wherein the inverter of the distributed energy resource is coupled to one distributed energy resource among a plurality of islandable distributed energy resources that are coupled to a Point of Common Coupling (PCC) of the microgrid.

15. The method of claim 12, wherein:
the inverter comprises an inverter of a distributed energy resource;
transitioning from the grid-connected mode comprises changing from a voltage-source grid-following mode of the inverter of the distributed energy resource to a voltage-source isochronous mode of the inverter of the distributed energy resource, in response to the first peer communication; and
transitioning from the islanded mode comprises changing from the voltage-source isochronous mode of the inverter of the distributed energy resource to another mode of the inverter of the distributed energy resource, in response to the second peer communication.

16. The method of claim 12, wherein receiving the first peer communication comprises subscribing, via a message bus of the microgrid, to a schedule change that is due to an anomaly event.

17. A method comprising:
opening a switch that is coupled to a Point of Common Coupling (PCC) of a microgrid; and
publishing, via a message bus of the microgrid, an event, in response to opening the switch, to trigger a change from a grid-connected mode of an inverter of the microgrid to an islanded mode of the inverter.

18. The method of claim 17, wherein:
the switch comprises an islanding switch; and
publishing the event comprises transmitting, as a peer communication in response to opening the islanding switch, a command to transition the inverter from the grid-connected mode to the islanded mode.

19. A method comprising:
detecting at a Point of Common Coupling (PCC) of a microgrid, restoration of power to a utility grid; and
publishing, via a message bus of the microgrid, an event that indicates the restoration of power, to trigger a change from an islanded mode of an inverter of the microgrid to a grid-connected mode of the inverter.

20. The method of claim 1,
wherein the switch is a recloser that is in a mid voltage or high voltage zone of a utility pole, and
wherein the mid voltage or high voltage zone has voltages between 4,000 Volts and 69,000 Volts.

21. The method of claim 1, wherein the switch is a motor-operated switch.

22. The method of claim 17,
wherein the PCC is coupled between the switch and the inverter, and
wherein the method further comprises subscribing, by the inverter via the message bus of the microgrid, to a schedule change that is due to the event.

* * * * *